United States Patent [19]

Yamada et al.

[11] 4,311,486
[45] Jan. 19, 1982

[54] PROCESS FOR PRODUCING COARSE GRAINS OF ALUMINUM HYDROXIDE

[75] Inventors: Koichi Yamada; Takuo Harato; Hisakatsu Kato; Yasumi Shiozaki, all of Niihama, Japan

[73] Assignee: Sumitomo Aluminium Smelting Company, Limited, Osaka, Japan

[21] Appl. No.: 175,535

[22] Filed: Aug. 5, 1980

[30] Foreign Application Priority Data

Aug. 13, 1979 [JP] Japan .................... 54/103295

[51] Int. Cl.³ ............................ B01D 9/02
[52] U.S. Cl. .................. 23/301; 23/305 A; 423/121; 423/127; 423/629
[58] Field of Search ........... 23/295 G, 301, 305 A; 423/119, 121, 127, 629

[56] References Cited

U.S. PATENT DOCUMENTS 2,657,978 11/1953 Johnson ............... 423/122
2,707,669 5/1955 Houston et al. ....... 423/127
3,486,850 12/1969 Day .................... 423/127
3,649,184 3/1972 Featherston .......... 423/629
3,838,980 10/1974 Gnyra ................. 23/305 A
3,906,084 9/1975 Gnyra ................. 423/629
4,234,559 11/1980 Tschamper ........... 23/301

FOREIGN PATENT DOCUMENTS 53-44920 12/1978 Japan .

Primary Examiner—Bradley Garris
Attorney, Agent, or Firm—Stevens, Davis, Miller & Mosher

[57] ABSTRACT

Coarse grains of aluminum hydroxide are economically produced in a high yield from sodium aluminate solution by dividing supersaturated sodium aluminate solution being prepared by the Bayer process and having a molar ratio of $Na_2O$ as caustic soda to $Al_2O_3$ in solution of less than 1.8 into two streams, adding a portion of recycle seed aluminum hydroxide and fine grains of aluminum hydroxide as seed to one of the streams of sodium aluminate solution, partially decomposing the sodium aluminate solution until the molar ratio of the sodium solution reaches 1.8–2.6, adding to the resulting partially decomposed sodium aluminate slurry the other stream of sodium aluminate solution, which has been cooled to a temperature low enough to lower the temperature of the partially decomposed sodium aluminate slurry by at least 3° C., and the remaining portion of recycle seed aluminum hydroxide, and then further decomposing the cooled and mixed sodium aluminate slurry until the molar ratio of the sodium aluminate slurry reaches 2.6–4.0. The resulting coarse grains of aluminum hydroxide have a high resistance to disintegration to fine powder when calcined.

16 Claims, 3 Drawing Figures

PROCESS FOR PRODUCING COARSE GRAINS OF ALUMINUM HYDROXIDE

The present invention relates to a process for producing alumina by the Bayer process or its modified process, which will be hereinafter referred to as "Bayer process", and more particularly to a process for economically obtaining coarse grains of aluminum hydroxide having less susceptibility to disintegration to powder, when calcined, in a high yield in the production of alumina from bauxite by the Bayer process.

As is well known, the production of alumina by the Bayer process comprises the steps of subjecting bauxite to hot alkali treatment usually at a temperature of 130° C. or higher, thereby extracting alumina from the bauxite, separating insoluble residues such as iron oxide, silicates, titanium oxide, etc. from the resulting slurry, adding aluminum hydroxide as a seed to the resulting clear sodium aluminate solution free from the insoluble residues, precipitating aluminum hydroxide at a temperature of about 50° to about 80° C., separating the precipitated aluminum hydroxide from the decomposed sodium aluminate solution, recycling a portion of fine granules of the separated aluminum hydroxide precipitate as seed, which will be hereinafter referred to as "recycle seed aluminum hydroxide", withdrawing, washing and calcining coarse grains of the aluminum hydroxide, thereby obtaining product alumina, while recycling the sodium aluminate mother liquor, as such or after concentration, to the step of bauxite digestion.

The alumina obtained according to the aforementioned process is mainly used as raw material alumina for production of aluminum, where the raw material alumina is classified into two groups, according to the grain size of alumina, that is, (1) floury alumina usually containing more than 20% by weight of grains passing through 325-mesh Tyler sieve, and (2) sandy alumina usually containing 10-15% by weight of grains passing through 325-mesh Tyler sieve. Recently, sandy alumina, that is, coarse grains of aluminum hydroxide, has been increasingly utilized on account of automation of aluminum electrolytic production, or on account of another stand point of an electrolysis plant such as to reduce an environmental problem.

According to the recent increasing demand for the coarse granules, the present inventors developed a process for economically obtaining coarse grains of aluminum hydroxide in high yield, that is, a process for producing coarse grains of aluminum hydroxide from a sodium aluminate solution, which comprises dividing a supersaturated sodium aluminate solution being prepared by Bayer the process and having a molar ratio [$Na_2O$ (caustic soda)/$Al_2O_3$ in solution] of less than 1.8 into two streams of sodium aluminate solution, adding aluminum hydroxide as seed to one of the streams of sodium aluminate solution, partially decomposing the seed-added stream until the molar ratio of the sodium aluminate solution reaches 1.8-2.6, adding the other stream of sodium aluminate solution, which has been cooled to a temperature low enough to lower the temperature of the partially decomposed stream of sodium aluminate solution in a slurry state at least by 5° C., to the partially decomposed stream of sodium aluminate slurry, and decomposing the mixed slurry of sodium aluminate until the molar ratio of the mixed slurry reaches 2.6-3.5, as disclosed in Japanese Patent Publication No. 44920/78. The process has a very high decomposition efficiency, and thus is very economical. Furthermore, the coarse grains of aluminum hydroxide are those formed only through crystal growth, and thus have a very high strength and thus are substantially never disintegrated to fine powder in the coarse of such handling as flash drying, pneumatic conveying, etc. Thus, they seem to be distinguished in these physical properties, but it has been found, to our great surprise, that they still have such disadvantages that when they are calcined in a gas stream or in a fluidized state in such a system as a cyclone preheater-rotary kiln-type calcining furnace or fluidized bed-type calcining furnace, or cyclone preheater-vertical calcining furnace, pneumatic calcining furnace or fluidized bed-type calcining furnace, etc., they are very susceptible to disintegration to fine powder, and the aforementioned distinguished characteristics of coarse grains of aluminum hydroxide are lost thereby.

Under these situations, the present inventors have made extensive studies of the mechanism of disintegration of coarse grains of aluminum hydroxide when calcined in a gas stream or in a fluidized state, and, as a result, have found that the disintegration to fine powder depends upon dehydration and/or thermal shock which occurs mainly at the conversion of the coarse grains of aluminum hydroxide to anhydrous alumina, and/or at the conversion of anhydrous alumina to $\alpha$-alumina, and furthermore on a mechanical action upon the grains at the aforementioned conversion, that is, on impingement of the grains against the vessel walls and/or mutual impingement of grains themselves, and that, when the formation of coarse grains of aluminum hydroxide is based on the crystal growth and the primary grain size is very large, as in the aforementioned process, larger cracks appear at the dehydration, and considerable disintegration to fine powder due to the thermal shock and/or mechanical action occurs, whereas, when the crystals constituting the coarse grains of aluminum hydroxide are coagulated masses of the primary grains mainly having grain sizes of 10-30 $\mu$m, a very good resistance to the disintegration to fine powder can be obtained.

As a result of further extensive studies to find a process for economically obtaining coarse grains of aluminum hydroxide with less susceptibility to disintegration to powder when calcined, in high yield, on the basis of the foregoing finding, the present inventors have established the present process which can satisfy the foregoing object.

The present invention provides a process for producing coarse grains of aluminum hydroxide from sodium aluminate solution, which comprises dividing a supersaturated sodium aluminate solution being prepared by the Bayer process and having a molar ratio [$Na_2O$ (caustic soda)/$Al_2O_3$ in solution] of less than 1.8 into two streams of sodium aluminate solution, adding aluminum hydroxide as seed to one of the streams of sodium aluminate solution, partially decomposing the seed-added stream until the molar ratio of the sodium aluminate solution reaches 1.8-2.6, adding the other stream of sodium aluminate solution, which has been cooled to a temperature low enough to lower the temperature of the partially decomposed stream of sodium aluminate solution in a slurry state at least by 3° C., to the partially decomposed stream of sodium aluminate slurry, and decomposing the mixed slurry of sodium aluminate until a molar ratio of the mixed slurry reaches at least 2.6, characterized by adding a portion of recycle seed aluminum hydroxide and fine grains of aluminum hydroxide as seed to one of the streams of sodium aluminate solution, partially decomposing the sodium aluminate solution until the molar ratio of the sodium aluminate solution reaches 1.8–2.6, adding to the resulting partially decomposed sodium aluminate slurry the other stream of sodium aluminate solution, which has been cooled to a temperature low enough to lower the temperature of the partially decomposed sodium aluminate slurry by at least 3° C., and the remaining portion of recycle seed aluminum hydroxide, and then further decomposing the sodium aluminate slurry cooled and mixed until the molar ratio of the sodium aluminate slurry reaches 2.6–4.0.

The present process will be described in detail below.

According to the present invention, sodium aluminate solution obtained by alkali dissolution of bauxite is divided into two streams of sodium aluminate solution before being led to a precipitation step. One of the divided streams of the sodium aluminate solution is led to the precipitation step, whereas the other stream of the sodium aluminate solution is led to a cooling step to cool the latter stream. The ratio of the stream of sodium aluminate solution to be led to the precipitation step to that to be led to the cooling step is 30-70:70-30, preferably 40-60:60-40, in percentage by volume. When the ratio of the stream of sodium aluminate solution to be led to the precipitation step is less than 30% by volume, the molar ratio of the mixed sodium aluminate slurry obtained by mixing with the cooled sodium aluminate solution from the cooling step is lowered, and consequently fine grains of aluminum hydroxide are more liable to be formed in excess. On the other hand, when the molar ratio exceeds 70% by volume, the amount of the cooled sodium aluminate solution from the cooling step is too small, and thus it will be difficult to lower the temperature of the mixed sodium aluminate slurry.

In the precipitation step, the sodium aluminate solution is admixed with a portion of recycle seed aluminum hydroxide and fine grains of aluminum hydroxide, which is characteristic of the present invention, and then subjected to partial decomposition until the molar ratio reaches 1.8–2.6.

As the recycle seed aluminum hydroxide, a fine granular fraction of aluminum hydroxide obtained by classification of the precipitate of aluminum hydroxide in the Bayer process, generally, a fraction containing at least 10% by weight of grains passing through 325-mesh Tyler sieve is usually used. The amount of recycle seed aluminum hydroxide is about 30 to about 150 kg per $m^3$ of the sodium aluminate solution.

On the other hand, as the fine grains of aluminum hydroxide as seed, grains of aluminum hydroxide having an average grain size of less than 10 μm, prepared separately, are used, and the amount of the fine grains of aluminum hydroxide to be added as seed is about 0.05 to about 2 kg per $m^3$ of the sodium aluminate solution.

When the amount of recycle seed aluminum hydroxide to be added is less than 30 kg/$m^3$ of the sodium aluminate solution, fine grains of aluminum hydroxide are generated too much (nucleation) and coarse grains of aluminum hydroxide cannot be obtained. On the other hand, when the amount exceeds 150 kg, due to less nucleation, crystal growth of primary grains occurs. That is, the resistance to disintegration to fine powder is undesirably deteriorated.

When the amount of fine grains of aluminum hydroxide to be added as seed is less than 0.05 kg/$m^3$ of the sodium aluminate solution, the effect of generating fine grain nuclei is so low that the desired coagulated masses of grains cannot be obtained. On the other hand, when the amount exceeds 2 kg, there is too large an amount of fine grains in the system, and the resulting aluminum hydroxide will have smaller grain size. That is, the desired coarse grains of aluminum hydroxide cannot be obtained.

Since the precipitation mechanism (nucleation, agglomeration and crystal growth) depends upon temperature, molar ratio, composition of Bayer solution, etc., it is necessary to rapidly determine the optimum amount of the fine grains of aluminum hydroxide to be used as seed together with the recycle seed aluminum hydroxide. However, correlations between these factors can be readily obtained by preliminary tests, and the fine grains as seed can be added to the sodium aluminate solution on the basis of the preliminary test results. In an actual process, the amount of the fine grains as seed can be appropriately adjusted while counting the particle number balance or maintaining the primary grain size of 10–30 μm in the precipitation step by means of a coulter counter or electron microscope.

Any aluminum hydroxide prepared according to any procedure can be used in the present invention as fine grains as seed, so long as the fine grains have an average grain size of less than 10 μm. However, the fine grains prepared by cooling of and/or addition of aluminum hydroxide gel to a supersaturated sodium aluminate solution are preferably used in the present invention.

When the average grain size of fine grains of aluminum hydroxide to be added as seed exceeds about 10 μm, no effect of inducing the nucleation is obtained, and the agglomeration activity of the grains themselves is deteriorated. Even if agglomeration of the grains themselves occurs, agglomeration of seed aluminum hydroxide into coarse grains is undesirably reduced.

In the present invention, the precipitation step at the first stage, which will be hereinafter referred to as the first stage precipitation step, is usually maintained at a temperature of 65°–80° C.

The sodium aluminate solution, which has been partially decomposed under the aforementioned conditions until the molar ratio has reached a range of 1.8–2.6, that is, a sodium aluminate slurry containing precipitated aluminum hydroxide, is then admixed with the other stream of the divided sodium aluminate solution, which has been cooled in advance, thereby enhancing the degree of supersaturation, and then further admixed with the remaining portion of recycle seed aluminum hydroxide and subjected to decomposition until the molar ratio reaches a range of 2.6–4.0.

When the molar ratio of the sodium aluminate slurry obtained by the partial decomposition in the first stage precipitation step is less than 1.8, the molar ratio of the slurry resulting from admixture with the cooled sodium aluminate solution in the succeeding step will be lowered, and thus a large amount of fine grains of aluminum hydroxide will be formed. On the other hand, it is not economical to carry out the decomposition to such a degree that the molar ratio exceeds 2.6, because it takes much time.

Cooling temperature necessary for the stream of the divided sodium aluminate solution in the cooling step depends upon the ratio of the amount of the stream to be led to the first stage precipitation step to the amount of the stream to be led to the cooling step, but the stream led in the cooling step must be cooled to a temperature low enough to lower the temperature of the admixed slurry, that is, the slurry resulting from admixture of the partially decomposed sodium aluminate slurry from the first precipitation step with the cooled stream from the cooling step, at least by 3° C., preferably at least by 5° C., more preferably at least by 7° C., lower than the temperature of the partially decomposed slurry from the first stage precipitation step. A temperature difference of less than 3° C. is not preferable, because a satisfactory degree of supersaturation cannot be attained in the admixed slurry, and also the final molar ratio to be obtained after the decomposition is low in such case. In other words, the decomposition efficiency is hardly improved.

For cooling the sodium aluminate solution, flasher tank, plate-type heat exchangers, tube nest-type heat exchangers, etc. can be used.

The cooled stream of the sodium aluminate solution is then mixed with the partially decomposed stream of the sodium aluminate solution. Mixing can be carried out in one place or in a plurality of places in a divided manner.

Final decomposition of the resulting cooled, admixed sodium aluminate slurry (the final decomposition will be hereinafter referred to as "second stage precipitation stage") is carried out by adding recycle seed aluminum hydroxide thereto. The amount of the recycle seed aluminum hydroxide to be added is about 30–about 150 kg/m$^3$ of the total sodium aluminate slurry in the second stage precipitation step.

When the amount of the recycle seed aluminum hydroxide to be added in the second stage precipitation step is less than 30 kg, the precipitation efficiency of aluminum hydroxide is not so much improved, though it also depends upon the temperature, molar ratio of $Na_2O/Al_2O_3$, etc. of the admixed sodium aluminate slurry to be treated, and the crystal growth is promoted or more nucleation occurs to the contrary, and the desired coagulated masses of crystal grains cannot be obtained. When the amount of the recycle seed aluminum hydroxide exceeds 150 kg on the other hand, an improvement of precipitation efficiency corresponding to the amount of the added recycle seed cannot be obtained, and the amount of the seed to be recycled in the system is increased to the contrary. In other words, an apparatus of larger scale is uneconomically required.

The addition of the recycle seed aluminum hydroxide in the second stage precipitation step can not always be carried out in one place, but in a plurality of places by dividing the precipitation step into a plurality of the steps within the aforementioned range of the amount of the recycle seed. A portion of the fine grains of aluminum hydroxide as added in the first stage precipitation step can be also added to the second stage precipitation step.

Usually, the same recycle seed aluminum hydroxide as used in the first stage precipitation step can be added, but the recycle seed can be classified into coarse grains and fine grains in advance, and the fine grains and the coarse grains can be supplied to the first stage precipitation step and the second stage precipitation step, respectively.

In the second stage precipitation step, the amount of the seed is increased and the partially decomposed sodium aluminate slurry is cooled by adding the cooled stream of clear sodium aluminate solution and the recycle seed aluminum hydroxide to the partially decomposed sodium aluminate slurry, whereby the degree of supersaturation of the slurry is increased and the decomposition rate is increased. That is, the decomposition to the range of a molar ratio of 2.6–4.0 can be realized in a short time.

Decomposition of the cooled, admixed sodium aluminate slurry in the second stage precipitation step is carried out generally at a temperature of not more than about 70° C., preferably at a temperature of 50° to 65° C.

The sodium aluminate solution which has been decomposed to the molar ratio of 2.6–4.0 in the aforementioned manner is then treated according to the conventional procedure.

The present process will be described in detail below, referring to the accompanying drawings, but the present process is not restricted thereto.

Figure 1:
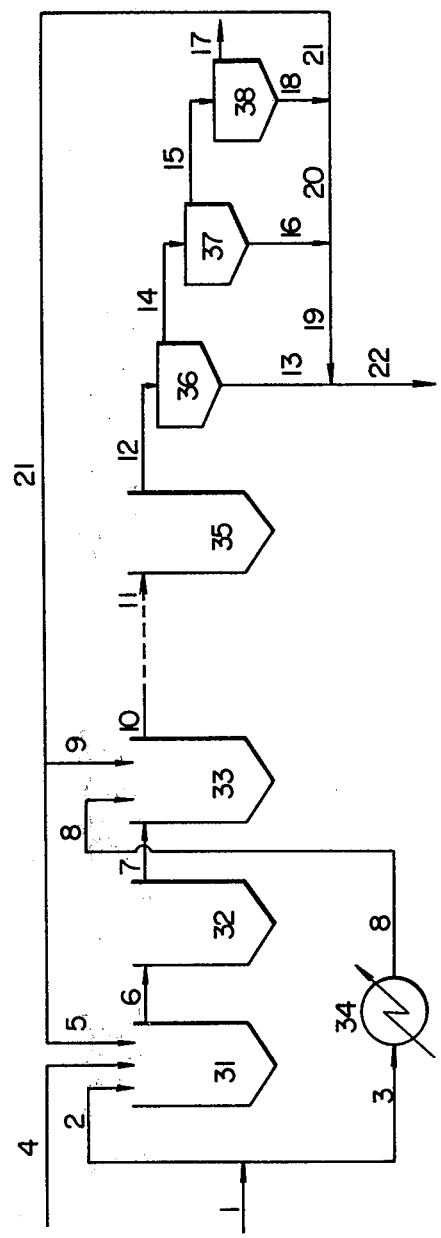
FIG. 1 is a flow diagram showing one embodiment of the present process.

In FIG. 1, a clear sodium aluminate solution obtained by alkali dissolution of bauxite and supplied through a conduit 1 is divided into two streams of sodium aluminate solution, and one stream thereof is led to a precipitation tank 31 through a conduit 2, whereas the other stream is led to a cooler 34 through a conduit 3.

The ratio of the amount of the stream to the conduit 2 to that of the stream to the conduit 3 is controlled to 30-70:70-30 in percentage by volume.

The stream of the divided sodium aluminate solution supplied to the precipitation tank 31 of the first stage precipitation step through the conduit 2 is partially decomposed by fine grains of aluminum hydroxide as seed supplied thereto through a conduit 4, and recycle seed aluminum hydroxide supplied thereto from a conduit 5. As the fine grains of aluminum hydroxide to be supplied as seed through the conduit 4, fine grains of aluminum hydroxide prepared separately by spontaneous precipitation from a sodium aluminate solution by cooling, or fine grains of aluminum hydroxide prepared separately by precipitation from a sodium aluminate solution by adding aluminum hydroxide gel thereto are used.

As the recycle seed aluminum hydroxide to be supplied to the precipitation tank 31 through a conduit 5, aluminum hydroxide usually containing at least 10% by weight of grains passing through a 325-mesh Tyler sieve, prepared by classifying aluminum hydroxide slurry, which has been withdrawn through a conduit 12, in classifiers 36, 37, 38, etc. to remove product aluminum hydroxide, is used through a conduit 21.

Partially decomposed sodium aluminate slurry containing precipitated aluminum hydroxide is discharged from the precipitation tank 31 to a precipitation tank 32 through a conduit 6, and further decomposed to a molar ratio of 1.8–2.6. The sodium aluminate slurry, which has been decomposed to the aforementioned molar ratio, is then led to a precipitation tank 33 in a second stage precipitation step through a conduit 7. The other stream of the divided sodium aluminate solution which has been passed through the conduit 3 and cooled through the cooler 34 is les to the precipitation tank 33 through a conduit 8. Furthermore, the recycle seed aluminum hydroxide is supplied to the precipitation tank 33 through a conduit 9.

Usually, the seed aluminum hydroxide supplied through the conduit 21 is branched therefrom and supplied through the conduit 9 to the precipitation tank 33 as the recycle seed aluminum hydroxide.

The partially decomposed sodium aluminate slurry supplied through the conduit 7 is mixed with the cooled sodium aluminate solution supplied through the conduit 8 and recycle seed aluminum hydroxide supplied in the conduit in the precipitation tank 33, whereby the temperature of slurry is lowered, and consequently the degree of supersaturation is increased. That is, the precipitation rate is considerably increased.

The sodium aluminate slurry further partially decomposed in the precipitation tank 33 can be then led to a series of successive precipitation tanks (not shown in the drawing) through conduit to successively decompose the sodium aluminate solution. The slurry, which has been further decomposed, is led to a precipitation tank 35 through a conduit 11, and is decomposed to a molar ratio of 2.6-4.0 in the precipitation tank 35.

The sodium aluminate slurry which has completed the decomposition is discharged from the precipitation tank 35 to a first stage classifier 36 through a conduit 12. The coarsest grains of aluminum hydroxide are obtained from the underflow of the classifier 36 and withdrawn through conduits 13 and 22 to make coarse grains of product alumina by washing and calcination (not shown in the drawing).

The overflow from the classifier 36 is supplied to a classifier 37 through a conduit 14 to separate fine grains of aluminum hydroxide as the underflow and a sodium aluminate solution as the overflow. The overflow is supplied to a classifier 38 through a conduit 15 to separate very fine grains of aluminum hydroxide as the underflow and a sodium aluminate solution as the overflow in the same manner as in the classifiers 36 and 37.

The precipitated aluminum hydroxide discharged through the conduits 16 and 18 is wholly or partly supplied to the precipitation step through the conduit 21 and used as the recycle seed aluminum hydroxide therein. On the other hand, the overflow from the classifier 38 is recyclically used as an alkali solution for dissolving bauxite through a conduit 17.

As described in detail above, the following advantages can be obtained according to the present process.
(1) Even if the resulting product aluminum hydroxide is calcined by flash calcination, etc., less disintegration to fine powder occurs, and thus the dimension of the calcining facility can be reduced and consumption of fuel such as heavy oil, etc. can be saved.
(2) Since the activity of seed can be kept always constant by addition of fine grains of aluminum hydroxide as seed, the product aluminum hydroxide having substantially uniform grain size can be obtained. That is, the stable product can be continuously obtained.
(3) Since the second stage precipitation step can be carried out at a lower temperature than that of the conventional precipitation procedure for producing sandy alumina, the molar ratio can be enhanced at the end of decomposition.
(4) Since the primary grain size of aluminum hydroxide as seed is small, the surface area of the seed is large, and consequently the precipitation rate of aluminum hydroxide is high.

The present invention will be further described in detail below, referring to Example, but the present invention is not restricted thereto.

EXAMPLE

A sodium aluminate solution having a molar ratio of 1.6 ($Na_2O$:110 g/l) at 70° C. was supplied at a rate of 250 m$^3$/hr through conduit 1 according to the flow diagram shown in FIG. 1, and divided into two streams in a proportion of 1:1. One stream was fed to precipitation tank 31 through conduit 2, and another stream to cooler 34 through conduit 3.

To the precipitation tank 31 were also supplied a sodium aluminate slurry containing 700 kg/m$^3$ of recycle seed aluminum hydroxide containing 14% by weight of grains passing through a 325-mesh Tyler sieve at a rate of 12.1 m$^3$/hr through conduit 5 and sodium aluminate slurry containing 130 kg/m$^3$ of fine grains of aluminum hydroxide having an average grain size of 5 $\mu$m as seed, which had been prepared by sponteneous precipitation by cooling sodium aluminate solution, independently from the present process, at a rate of 1.3 m$^3$/hr through conduit 4. The concentration of seed aluminum hydroxide amounted to about 63 kg/m$^3$ in the precipitation tank 31.

Total residence time in the precipitation tanks 31 and 32 was about 24 hours, and the sodium aluminate slurry containing precipitated aluminum hydroxide, discharged through conduit 7 had a temperature of 68° C. and a molar ratio of 2.28.

On the other hand, the stream of sodium aluminate solution led to the cooler 34 through the conduit 3 was cooled to 60° C. by the cooler 34 and then supplied to a precipitation tank 33 through conduit 8. To the precipitation tank 33 was also supplied a slurry containing recycle seed aluminum hydroxide with the same composition as supplied to the precipitation tank 31 at a rate of 29.6 m$^3$/hr through conduit 9. The temperature of the admixed sodium aluminate slurry in the precipitation tank 33 was lowered to about 63° C. Residence time in precipitation tanks 33-35 was about 42 hours, and the sodium aluminate solution discharged from conduit 12 had a temperature of 56° C. and a molar ratio of 2.9.

Figure 2:
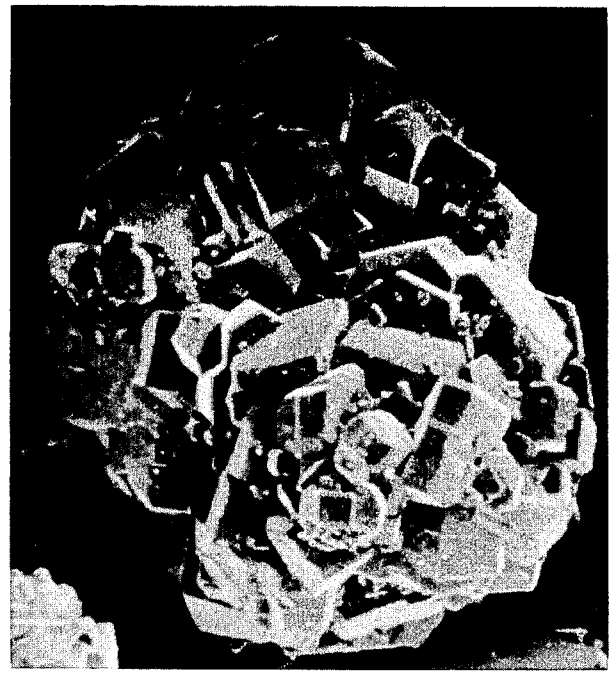
FIG. 2 is a microscopic picture showing a crystalline state of aluminum hydroxide obtained according to the present process.

The amount of the precipitated aluminum hydroxide corresponded to about 45% of the alumina content in the fed sodium aluminate solution. The grain size distribution of product aluminum hydroxide obtained by classification through conduits 13 and 22 was measured, and the results are shown in Table 1. The microscopic picture of crystal grain is shown in FIG. 2.

For comparison, precipitation operation was carried out according to the conventional process, that is, by omitting the supply of the slurry containing the fine grains of aluminum hydroxide as seed to the precipitation tank 31 but by additionally supplying the recycle seed aluminum hydroxide in an amount corresponding to the amount of the fine grains as seed to the precipitation tank 31 and also by supplying the necessary amount of recycle seed aluminum hydroxide for the precipitation tank 33 through 9 in the Example as described above to the precipitation tank 31 through the conduit 5, other conditions being the same as in the above Example.

Figure 3:
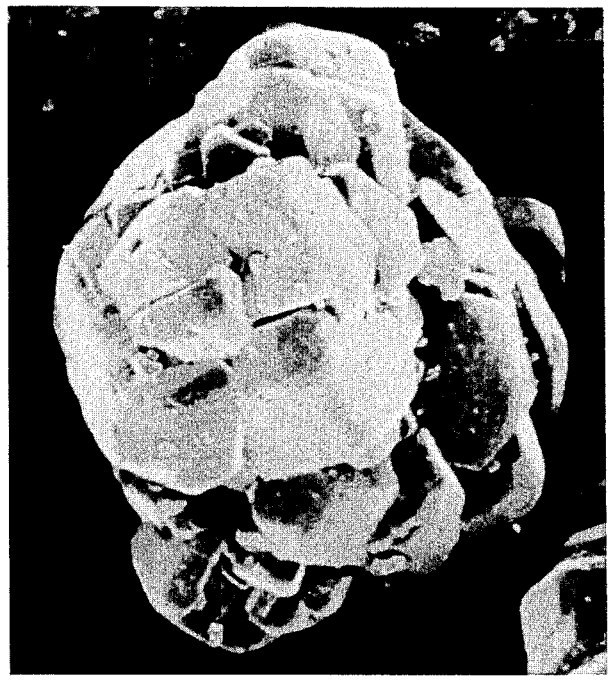
FIG. 3 is a microscopic picture showing a crystalline state of aluminum hydroxide obtained according to the conventional process.

The amount of the precipitated aluminum hydroxide corresponded to about 43% of the alumina content of the fed sodium aluminate solution. The grain size distribution of product aluminum hydroxide obtained by classification is given in Table 1, and a microscopic picture of the crystal grain is given in FIG. 3.

Coarse grains of aluminum hydroxide are withdrawn from the classifier 36, washed, and calcined in a short kiln with a pneumatic calcining furnace, and grain size distribution of the resulting alumina was measured. The results are also shown in Table 1 together with the foregoing results.

TABLE 1

| Grain size | Example | | Comp. Ex. | |
|---|---|---|---|---|
| (Tyler sieve mesh) | Aluminum hydroxide (%) | Alumina (%) | Aluminum hydroxide (%) | Alumina (%) |
| +100 | 3.0 | 1.0 | 1.0 | 0 |
| +150 | 31.2 | 25.0 | 35.7 | 6.9 |
| +200 | 71.9 | 65.2 | 84.3 | 40.2 |
| +325 | 98.8 | 95.5 | 98.0 | 76.3 |

As is evident from Table 1, coarse grains of aluminum hydroxide having a high resistance to disintegration to fine powder when calcined can be obtained according to the present invention.

COMPARATIVE EXAMPLE

Aluminum hydroxide was precipitated and calcined in the same manner as in the above Example, except that the average grain size of fine grains of aluminum hydroxide as seed to be supplied through the conduit 4 was changed to the seeding conditions shown in Table 2, while the supplying rate was equal to that of said Example, and the supplying rate of the fine grains of aluminum hydroxide as seed was changed to the seeding conditions shown in Table 2 while the average grain size was equal to that of said Example.

Grain size of the precipitated aluminum hydroxide discharged as product and grain size of alumina resulting from calcination of the aluminum hydroxide were measured. The results are shown in Table 2.

TABLE 2

| | Grain size distribution | | | | | | | |
|---|---|---|---|---|---|---|---|---|
| | Aluminum hydroxide (Tyler sieve mesh) | | | | Alumina (Tyler sieve mesh) | | | |
| Seeding conditions | +100 % | +150 % | +200 % | +325 % | +100 % | +150 % | +200 % | +325 % |
| Average grain size 20 μm | 1.5 | 49.5 | 86.4 | 97.0 | 0 | 5.9 | 39.5 | 79.2 |
| Supplying rate 0.01 kg/m³ | 1.2 | 29.5 | 66.8 | 95.0 | 0 | 4.2 | 31.8 | 78.0 |
| Supplying rate 3 kg/m³ | 0 | 14.0 | 46.6 | 81.0 | — | — | — | — |

As is evident from Table 2, disintegration of calcined alumina to fine powder is considerable when the average grain size of fine grains of aluminum hydroxide as seed is larger than the specific range of the present invention, or when the supplying rate of fine seed is lower than that of the present invention. On the other hand, coarse grains of alumina cannot be obtained when the supplying rate of fine seed is higher than that of the present invention.

What is claimed is:

1. In a process for producing coarse grains of aluminum hydroxide from sodium aluminate solution, which comprises dividing supersaturated sodium aluminate solution being prepared by the Bayer process and having a molar ratio of $Na_2O$ as caustic soda to $Al_2O_3$ in solution of less than 1.8 into two streams of sodium aluminate solution, adding aluminum hydroxide as seed to one of the streams of sodium aluminate solution, partially decomposing the seed-added stream until the molar ratio of the sodium aluminate solution reaches 1.8-2.6, adding the other stream of sodium aluminate solution, which has been cooled to a temperature low enough to lower the temperature of the partially decomposed stream of sodium aluminate solution in a slurry state at least by 3° C., to the partially decomposed stream of sodium aluminate slurry, and decomposing the mixed slurry of sodium aluminate until a molar ratio of the mixed slurry reaches at least 2.6, the improvement comprising adding a portion of recycle seed aluminum hydroxide and fine grains of aluminum hydroxide as seed to one of the streams of sodium aluminate solution, the fine grains of aluminum hydroxide added as seed having an average grain size of less than 10 μm, partially decomposing the sodium aluminate solution until the molar ratio of the sodium aluminate solution reaches 1.8-2.6, adding to the resulting partially decomposed sodium aluminate slurry the other stream of sodium aluminate solution, which has been cooled to a temperature low enough to lower the temperature of the partially decomposed sodium aluminate slurry by at least 3° C., and the remaining portion of recycle seed aluminum hydroxide, and then further decomposing the cooled and mixed sodium aluminate slurry until the molar ratio of the sodium aluminate slurry reaches 2.6-4.0.

2. The process according to claim 1, wherein the stream of sodium aluminate solution to be partially decomposed and the stream of sodium aluminate solution to be cooled are in a ratio of 30-70:70-30 in percentage by volume.

3. The process according to claim 2, wherein the ratio is 40-60:60-40 in percentage by volume.

4. The process according to claim 1, wherein the recycle seed aluminum hydroxide is a classified fine grain fraction of aluminum hydroxide precipitated by the Bayer process and contains at least 10% by weight of grains passing through 325-mesh Tyler sieve.

5. The process according to claim 1, wherein the recycle seed aluminum hydroxide added to the stream of sodium aluminate solution to be partially decomposed is in an amount of 30-150 kg/m³ of the sodium aluminate solution.

6. The process according to claim 1, wherein the fine grains of aluminum hydroxide added as seed to the stream of sodium aluminate solution to be partially decomposed are in an amount of 0.05-2 kg/m³ of the sodium aluminate solution.

7. The process according to claim 1, wherein the fine grains of aluminum hydroxide as seed are prepared by cooling of supersaturated sodium aluminate solution or the addition of aluminum hydroxide gel to supersaturated sodium aluminate solution.

8. The process according to claim 1, wherein the partial decomposition for precipitating aluminum hydroxide is carried out at 65°-80° C.

9. The process according to claim 1, wherein the other stream of sodium aluminate solution, which has been cooled to a temperature low enough to lower the temperature of the partially decomposed sodium aluminate slurry by at least 5° C. is added to the partially decomposed sodium aluminate slurry.

10. The process according to claim 9, wherein the other stream of sodium aluminate solution, which has been cooled to a temperature low enough to lower the temperature of the partially decomposed sodium aluminate slurry by at least 7° C. is added to the partially decomposed sodium aluminate slurry.

11. The process according to claim 1, wherein the cooling of the other stream of sodium aluminate solution is carried out in a flasher tank, a plate-type heat exchanger or a tube nest-type heat exchanger.

12. The process according to claim 1, wherein the addition of the cooled stream of sodium aluminate solution to the partially decomposed solution is made in one place or in a plurality of places in a divided manner.

13. The process according to claim 1, wherein the remaining portion of recycle seed aluminum hydroxide to be added to the partially decomposed sodium aluminate slurry is in an amount of 30–150 kg/m$^3$ of total sodium aluminate solution including the other stream of cooled sodium aluminate solution.

14. The process according to claim 1, wherein the remaining portion of recycle seed aluminum hydroxide is added to the partially decomposed sodium aluminate slurry in one place or in a plurality of places in a divided manner.

15. The process according to claim 1, wherein the decomposition of the cooled sodium aluminate slurry is carried out at not more than 70° C.

16. The process according to claim 15, wherein the decomposition is carried out at 50° to 65° C.

* * * * *